Aug. 10, 1948.  C. S. BULL  2,446,572
DAMPING CIRCUIT EMBODYING ELECTRON DISCHARGE
DEVICES OF THE VELOCITY MODULATION TYPE
Filed Feb. 5, 1944
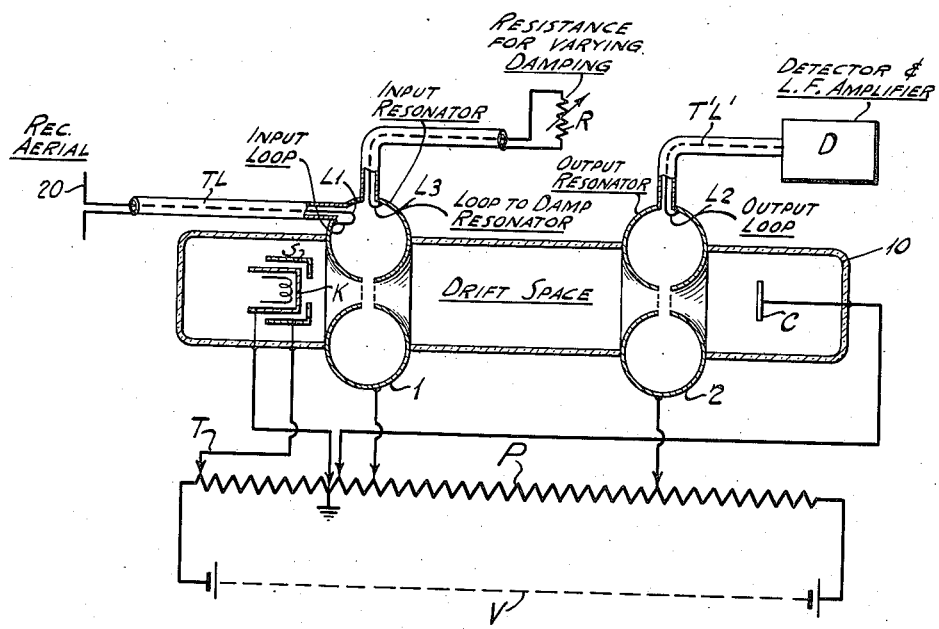
INVENTOR
*Cabot Seaton Bull.*
BY *H.S. Grover*
ATTORNEY Patented Aug. 10, 1948

2,446,572

UNITED STATES PATENT OFFICE 2,446,572

DAMPING CIRCUIT EMBODYING ELECTRON DISCHARGE DEVICES OF THE VELOCITY MODULATION TYPE

Cabot Seaton Bull, Hillingdon, England, assignor to Electric & Musical Industries Limited, Hayes, Middlesex, England, a company of Great Britain Application February 5, 1944, Serial No. 521,230
In Great Britain April 11, 1941

Section 1, Public Law 690, August 8, 1946
Patent expires April 11, 1961

3 Claims. (Cl. 315—6)

This invention relates to amplifier circuit arrangements for use at very high frequencies embodying electron discharge devices of the velocity modulation type.

It has been proposed to construct an electron discharge device in which an electron beam is caused to pass through a gap in a hollow resonator which latter forms an input circuit to which modulating voltages or signals to be amplified are applied. The signals set up electric waves in the hollow resonator and the electron beam in passing through the hollow resonator becomes velocity modulated and thereafter the beam is caused to pass through a sufficient distance to enable bunching of the electrons to occur so that the velocity modulation becomes converted to so-called charge density modulation, the electron beam then passing through a gap in a further hollow resonator which constitutes the output circuit from which an amplified output can be obtained. Other forms of devices employing velocity modulation are known in which the input circuit is in the form of a resonating transmission line or in the form of a conventional tuned circuit, these input circuits being connected to electrodes which are coupled to the beam so as to impart velocity modulation thereto.

In devices of this kind the electron beam is not entirely uniform due to the so-called "shot" effect and consequently the variations in the charge density of the beam cause noise currents to flow in the input circuit. These noise currents set up voltages across the input circuit and these voltages apply velocity modulation to the beam and consequently give rise to noise currents in the output circuit. Noise currents are also induced directly into the output circuit by the variations in charge density of the beam due to "shot" effect. Now, for a given signal input power, the velocity modulation applied to the beam varies as the square root of the impedance of the input circuit, whereas the velocity modulation due to the "shot" effect is directly proportional to the impedance of the input circuit. Consequently, an input circuit of high impedance tends to give rise to excessive noise in the output circuit. If, on the other hand, the impedance of the input circuit is made low, both the signal and the noise due to the input circuit in the output circuit will be small and may be less than the noise directly induced in the output circuit by the "shot" noise in the beam.

It is the object of the present invention to provide an improved circuit arrangement embodying an electron discharge device of the velocity-modulation type with a view to improving the signal/noise ratio.

According to the invention an amplifier circuit arrangement is provided embodying an electron discharge device of the velocity-modulation type in which it is arranged that the impedance of the input circuit as presented to the electron beam is equal, or approximately equal, to the reciprocal of the mutual conductance of the device.

The impedance $R_1$ of the input circuit as presented to the beam for optimum signal/noise ratio should therefore be equal to $$\frac{1}{g} \cdot R_1$$

and $g$ can be ascertained in the following manner.

The impedance $R_1$ is defined as $\beta^2 R_r$, where $R_r$ is the impedance of the input circuit at the resonant frequency measured across the modulating gap or electrodes, and $\beta$ is the coupling factor or velocity coefficient, determined by the geometry of the discharge device, and defined as the ratio $$\frac{V_b}{V_r}$$

where $V_b$ is the amplitude of the velocity-modulation (in volts) impressed on the beam by a sinusoidal voltage of amplitude $V_r$ across the modulating gap or across the electrodes where the beam becomes velocity-modulated.

Thus, if a signal power $P$ is developed in the input circuit, we shall have $$P = \frac{V_r^2}{2R_r}$$

$$= \frac{V_b^2}{2\beta^2 R_r} = \frac{V_b^2}{2R_1}$$

$$\therefore R_1 = \frac{V_b^2}{2P}$$

Now $V_b$ can be measured by means of a low voltage collecting electrode. If the bias on such a collecting electrode is set so that a given small electron current is received in the absence of modulation, and if then the modulation be applied and the bias changed so as to restore the current collected by the collecting electrode to its previous value, then the change of bias (in volts) will be substantially equal to the amplitude (in volts) of the velocity modulation impressed on the electron beam.

Thus, knowing $P$ and $V_b$, $R_1$ can be determined.
The mutual conductance $g$ of the device is defined as the amplitude of the output current in the beam at signal frequency set up when a velocity-modulation of amplitude 1 volt is impressed on the electron beam. It can be shown that $$g = \frac{2i_1 J_1 \left( Gl\omega V_0^{-\frac{3}{2}} V_b \right)}{V_b}$$

where $i_1$ = mean beam current.
$V_0$ = mean beam velocity (in volts).
$l$ = length of drift space.
$G = 8.44 \times 10^{-10}$.
$\omega = 2\pi$ times the frequency of modulation.

The value of $g$ can thus be calculated for any given tube.

Alternatively, the value of $g$ may be determined experimentally by measuring the power output for a given degree of velocity-modulation. Thus, by definition: the output current $i_0$ is given by $$i_0 = gV_b$$

Now, if $R_0$ is the impedance of the output circuit as presented to the beam, the power output $P_0$ is given by $$P_0 = \tfrac{1}{2} i_0^2 R_0 = \tfrac{1}{2} g^2 V_b^2 R_0$$

If, however, this output power was developed from an input power $P$ applied to the input circuit, then $$\frac{V_b^2}{2R_1} = P$$

and we have $$P_0 = g^2 R_1 R_0 P$$

or $$g = \sqrt{\frac{P_0}{P R_1 R_0}}$$

Now, $R_0$ can be measured by the method above referred to for the measurement of $R_1$ and $P$ and $P_0$ can be measured in well known manner, so that $g$ can be determined experimentally.

The desired condition, i. e., $$R_1 = \frac{1}{g}$$

can be achieved by suitably adjusting the impedance $R_1$ of the input circuit and/or by arranging the device to operate with an appropriate beam current.

The invention may be applied to any suitable construction of device employing velocity modulation. Where hollow resonators are employed, they may be of any suitable shape. For example, the resonators may be in the form of toroids generated by the revolution of substantially dumbbell shaped figures or they may be of the form referred to in the specification of co-pending British Patent applications Nos. 4073/40 and 515/41. It is not essential to employ devices having hollow resonators in the invention since the invention is equally applicable to the other forms of velocity-modulating devices hereinbefore referred to.

One embodiment of a velocity modulation receiving and amplifying system in accordance with the present invention is shown in the single figure of the drawing wherein there are provided two hollow resonators 1 and 2 in the form of toroids through whose gaps are passed an electron stream by means of cathode K forming one electrode of an evacuated electron discharge device 10. Resonator 1 is the input resonator, while resonator 2 is the output resonator. The evacuated tube contains an envelope in which there is a cathode K, a shield S for the cathode, and an electron collector electrode C. A suitable drift space exists between the two resonators 1 and 2. A receiving aerial 20 is coupled to the input resonator 1 by means of a coaxial line TL and a loop L1. Output is taken from the resonator 2 by means of a loop L2 coupled to a suitable line T'L', in turn, coupled to a detector and low frequency amplifier system D. The cathode shield S is connected to a potentiometer P by means of a suitable tapping connection T so that the potential of the cathode shield can be varied to enable the beam current to be controlled. A source of supply voltage V is connected across the potentiometer P. In order to adjust the impedance of the input resonator 1, there is shown a loop L3 projecting into the input resonator, this loop terminating in a variable resistance R for introducing damping into the resonator.

Having now particularly described and ascertained the nature of my said invention and in what manner the same is to be performed, I declare that what I claim is:

1. A velocity modulation amplifier comprising a velocity modulation type vacuum tube having an evacuated envelope and contained therein, a cathode, an electrical input cavity resonator, an electrical output cavity resonator and means to project electrons in the form of a beam from said cathode successively through said input and output resonator, input means coupled to said input cavity resonator, a coupling loop in the interior of said input cavity resonator to couple thereto, a two-conductor line coupled to said coupling loop and extending externally of said input resonator, and a resistance coupled directly across the conductors of said line, the impedance presented to said electron beam by said input resonator with said resistance coupled thereto through said line being substantially equal to the reciprocal of the mutual conductance of the tube to provide an improved signal-to-noise ratio over its value when said resistance is not coupled thereto.

2. The velocity modulation amplifier claimed in claim 1, further comprising a second coupling loop within said input cavity resonator, said input means being coupled to said input cavity resonator with said second coupling loop.

3. The velocity modulation amplifier claimed in claim 1, further comprising a second coupling loop within said input cavity resonator, said input means being coupled to said input cavity resonator by connection to said second coupling loop.

CABOT SEATON BULL.

REFERENCES CITED

The following references are of record in the file of this patent:

UNITED STATES PATENTS

| Number | Name | Date |
|---|---|---|
| 2,239,905 | Trevor | Apr. 29, 1941 |
| 2,280,026 | Brown | Apr. 14, 1942 |
| 2,280,824 | Hansen et al. | Apr. 28, 1942 |
| 2,312,919 | Litton | Mar. 2, 1943 |
| 2,368,031 | Llewellyn | Jan. 23, 1945 |
| 2,411,151 | Fisk | Nov. 19, 1946 |
| 2,422,028 | Martin, Jr. | June 10, 1947 |
| 2,422,695 | McRae | June 24, 1947 |